US011822784B2

(12) United States Patent
Luo et al.

(10) Patent No.: US 11,822,784 B2
(45) Date of Patent: Nov. 21, 2023

(54) SPLIT-SCREEN DISPLAY PROCESSING METHOD AND APPARATUS, DEVICE, AND STORAGE MEDIUM

(71) Applicant: Huawei Technologies Co., Ltd., Shenzhen (CN)

(72) Inventors: Yi Luo, Shenzhen (CN); Lubing Xie, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 17/613,748

(22) PCT Filed: May 21, 2020

(86) PCT No.: PCT/CN2020/091515
§ 371 (c)(1),
(2) Date: Nov. 23, 2021

(87) PCT Pub. No.: WO2020/238744
PCT Pub. Date: Dec. 3, 2020

(65) Prior Publication Data
US 2022/0253212 A1 Aug. 11, 2022

(30) Foreign Application Priority Data
May 24, 2019 (CN) .......................... 201910441915.9

(51) Int. Cl.
*G06F 3/04886* (2022.01)
*G06F 3/0484* (2022.01)

(52) U.S. Cl.
CPC ........ *G06F 3/04886* (2013.01); *G06F 3/0484* (2013.01)

(58) Field of Classification Search
CPC .. G06F 3/04886; G06F 3/0484; G06F 3/0488; G06F 3/0481; G06F 3/04883; G06F 2203/04803
See application file for complete search history.

(56) References Cited

U.S. PATENT DOCUMENTS

| 10,295,870 B2* | 5/2019 | Ko ........................... G09G 5/14 |
| 10,528,222 B2* | 1/2020 | Park .................... G06F 3/04817 |
| 11,042,284 B2* | 6/2021 | Lee ...................... G06F 3/0486 |
| 2011/0075280 A1 | 3/2011 | Chou et al. |

(Continued)

FOREIGN PATENT DOCUMENTS

| CN | 103744849 A | 4/2014 |
| CN | 104820552 A | 8/2015 |

(Continued)

*Primary Examiner* — Ryan F Pitaro
(74) *Attorney, Agent, or Firm* — Conley Rose, P.C.

(57) ABSTRACT

A method includes obtaining, a screen splitting operation from a user on a touchscreen, splitting a current display screen into two areas based on the screen splitting operation, displaying, in a first area, an interface of a first application that is displayed on the display screen before splitting the screen, obtaining, from installed applications and using a clustering algorithm, at least one second application to combine with the first application in a split-screen manner, displaying an identifier of the at least one second application in a second area after the screen splitting, and displaying, in the second area, a third application that is currently running in a system.

20 Claims, 7 Drawing Sheets

(56) References Cited

U.S. PATENT DOCUMENTS

| | | | |
|---|---|---|---|
| 2012/0311637 A1 | 12/2012 | Anthru et al. | |
| 2013/0346912 A1* | 12/2013 | Buening | G06F 3/0482 715/783 |
| 2014/0213318 A1* | 7/2014 | Leem | G06F 3/0482 455/566 |
| 2014/0325428 A1* | 10/2014 | Lee | G06F 3/0488 715/781 |
| 2014/0351722 A1* | 11/2014 | Frederickson | G06F 3/0481 715/761 |
| 2016/0343350 A1* | 11/2016 | Khoury | G06F 3/0481 |
| 2018/0113586 A1* | 4/2018 | Arar | H04L 67/306 |
| 2018/0356972 A1* | 12/2018 | Wang | G06F 3/04883 |
| 2019/0243516 A1* | 8/2019 | Shim | G06F 3/04886 |
| 2020/0133482 A1* | 4/2020 | Kim | G06F 3/04886 |
| 2020/0183574 A1 | 6/2020 | Chen et al. | |
| 2020/0210028 A1* | 7/2020 | Jeong | G06F 9/451 |
| 2020/0225848 A1* | 7/2020 | Yoon | G06F 1/1626 |
| 2020/0356427 A1* | 11/2020 | Hong | G06F 9/542 |
| 2020/0412726 A1* | 12/2020 | Nevatia | H04L 63/102 |
| 2021/0208777 A1* | 7/2021 | Jung | G06F 3/1423 |
| 2021/0342050 A1* | 11/2021 | Wang | G06F 3/0488 |
| 2022/0011925 A1* | 1/2022 | Tao | G06F 9/451 |
| 2022/0035494 A1* | 2/2022 | Lee | G06F 3/14 |
| 2023/0004288 A1* | 1/2023 | Kang | G06F 3/04886 |

FOREIGN PATENT DOCUMENTS

| | | |
|---|---|---|
| CN | 105389194 A | 3/2016 |
| CN | 106598529 A | 4/2017 |
| CN | 107402709 A | 11/2017 |
| CN | 107423063 A | 12/2017 |
| CN | 107621922 A | 1/2018 |
| CN | 108595100 A | 9/2018 |
| CN | 108932093 A | 12/2018 |
| CN | 109032484 A | 12/2018 |
| CN | 110333818 A | 10/2019 |
| EP | 3951578 A1 | 2/2022 |
| WO | 2014107787 A1 | 7/2014 |
| WO | 2019014859 A1 | 1/2019 |

* cited by examiner

SPLIT-SCREEN DISPLAY PROCESSING METHOD AND APPARATUS, DEVICE, AND STORAGE MEDIUM

CROSS-REFERENCE TO RELATED APPLICATIONS

This is a U.S. National Stage of International Patent Application No. PCT/CN2020/091515 filed on May 21, 2020, which claims priority to Chinese Patent Application No. 201910441915.9 filed on May 24, 2019, both of which are hereby incorporated by reference in their entireties.

TECHNICAL FIELD

This application relates to intelligent terminal technologies, and in particular, to a split-screen display processing method and apparatus, a device, and a storage medium

BACKGROUND

With development of intelligent device technologies, a user uses an intelligent device in more occasions in life. For an intelligent device with a touchscreen, for example, a tablet computer or a large-screen mobile phone, the user often has a requirement of starting two applications at the same time. A commonly used intelligent device can display an interface of only one application on a screen. When the user wants to operate an interface of another application, the user needs to exit the current application, and enter the interface of the another application through an operation. This is quite inconvenient.

To address the foregoing problem, in the conventional technology, split-screen display solutions are provided in the intelligent devices. Currently, in a common split-screen display solution, the user first performs an operation on a system navigation bar, and touches and holds a "historical task" button to enter a screen splitting operation process. The user taps a "split screen" icon of an application screenshot from the historical task, selects an application or touches and holds an application as prompted, and drags the application to an area after screen splitting. There are two display areas on the screen after the screen splitting. Generally, an application first selected is in a left area. A right area on the other side displays a home screen of the intelligent device, and the home screen displays all applications installed on the device. The user finds a second application requiring a split screen from these applications, and enables the screen splitting, so that the second application is displayed in the right area.

However, a current manner for enabling screen splitting is relatively rigid, has complex steps, and does not fully consider use scenarios of the user. Consequently, good user experience cannot be provided.

SUMMARY

Embodiments of this application provide a split-screen display processing method and apparatus, a device, and a storage medium, to resolve a problem that user experience is poor because a current manner for enabling screen splitting is relatively rigid, has complex steps, and does not fully consider use scenarios of the user.

A first aspect of this application provides a split-screen display processing method. The method includes:
   obtaining a screen splitting operation performed by a user on a touchscreen;
   splitting a current display screen into two areas based on the screen splitting operation, and displaying, in a first area, an interface of a first application that is displayed on the display screen before the screen splitting;
   obtaining, from installed applications by using a clustering algorithm, at least one second application to be combined with the first application in a split-screen manner; and
   displaying an identifier of the at least one second application in a second area after the screen splitting.

In a specific implementation, the method further includes:
   after the user selects a third application from the at least one second application, starting the third application, and displaying an interface of the third application in the second area.

Further, the method further includes:
   if it is detected that the user performs a tapping operation on a division line between the first area and the second area, displaying a split-screen control in the first area or the second area.

Further, the method further includes:
   if it is detected that the user taps the split-screen control, splitting the display screen into three areas, where a first area displays the interface of the first application, and a second area displays the interface of the third application;
   obtaining, from the installed applications by using the clustering algorithm, at least one fourth application to be combined with the first application and/or the third application in the split-screen manner; and
   displaying an identifier of the at least one fourth application in a third area after the screen splitting.

In a specific implementation, the screen splitting operation includes any one of the following operations:
   a touching and holding operation on an edge of the touchscreen;
   an operation of sliding toward the center of the touchscreen after an edge of the touchscreen is touched and held; or
   an operation of sliding from an edge to the center of the touchscreen.

Based on any one of the foregoing implementations, in a specific implementation, the obtaining, from installed applications by using a clustering algorithm, at least one second application to be combined with the first application in a split-screen manner includes:
   obtaining, by using an unsupervised learning clustering algorithm and based on historical data of combining each installed application with the first application in the split-screen manner, the at least one second application that is best combined with the first application in the split-screen manner.

In a specific implementation, the obtaining, by using an unsupervised learning clustering algorithm and based on historical data of combining each installed application with the first application in the split-screen manner, the at least one second application that is best combined with the first application in the split-screen manner includes:
   calculating a Euclidean distance between each application and the first application based on a quantity of times of combining each application with the first application in the split-screen manner and a total quantity of times of combining all the applications with the first application in the split-screen manner:
   sorting in ascending order based on the Euclidean distance between each application and the first application; and obtaining, from the sorted applications, at least one second application with a shortest Euclidean distance to the first application.

The historical data of combining each application with the first application in the split-screen manner includes the quantity of times of combining each application with the first application in the split-screen manner.

Based on any one of the foregoing implementations, optionally, the method further includes:

when the at least one second application is displayed in the second area, further displaying another started application in a system in the second area.

A second aspect of this application provides a split-screen display processing apparatus, including an obtaining module, a processing module, and a display module.

The obtaining module is configured to obtain a screen splitting operation performed by a user on a touchscreen.

The processing module is configured to split a current display screen into two areas based on the screen splitting operation, and control the display module to display, in a first area, an interface of a first application that is displayed on the display screen before the screen splitting.

The processing module is further configured to obtain, from installed applications by using a clustering algorithm, at least one second application to be combined with the first application in a split-screen manner.

The processing module is further configured to control the display module to display an identifier of the at least one second application in a second area after the screen splitting.

Optionally, the processing module is further configured to:

after the user selects a third application from the at least one second application, start the third application, and control to display an interface of the third application in the second area.

Optionally, the processing module is further configured to:

if it is detected that the user performs a tapping operation on a division line between the first area and the second area, control to display a split-screen control in the first area or the second area.

Optionally, the processing module is further configured to:

if it is detected that the user taps the split-screen control, split the display screen into three areas, and control the display module to display the interface of the first application in a first area and to display the interface of the third application in a second area:

obtain, from the installed applications by using the clustering algorithm, at least one fourth application to be combined with the first application and/or the third application in the split-screen manner; and control the display module to display an identifier of the at least one fourth application in a third area after the screen splitting.

Optionally, the screen splitting operation includes any one of the following operations:

a touching and holding operation on an edge of the touchscreen:

an operation of sliding toward the center of the touchscreen after an edge of the touchscreen is touched and held; or an operation of sliding from an edge to the center of the touchscreen.

Optionally, the processing module is specifically configured to:

obtain, by using an unsupervised learning clustering algorithm and based on historical data of combining each installed application with the first application in the split-screen manner, the at least one second application that is best combined with the first application in the split-screen manner.

Optionally, the processing module is specifically configured to:

calculate a Euclidean distance between each application and the first application based on a quantity of times of combining each application with the first application in the split-screen manner and a total quantity of times of combining all the applications with the first application in the split-screen manner;

sort in ascending order based on the Euclidean distance between each application and the first application; and obtain, from the sorted applications, at least one second application with a shortest Euclidean distance to the first application.

The historical data of combining each application with the first application in the split-screen manner includes the quantity of times of combining each application with the first application in the split-screen manner.

Optionally, the processing module is further configured to:

control the display module to display the at least one second application in the second area and further display another started application in a system in the second area.

A third aspect of this application provides a terminal device, including:

a processor, a memory, and a display, where the memory is configured to store a program and data, and the processor invokes the program stored m the memory, to perform the split-screen display processing method provided in any one of the first aspect.

A fourth aspect of this application provides a computer-readable storage medium. The computer-readable storage medium includes a program, and when being executed by a processor, the program is used to perform the split-screen display processing method provided in any implementation of the first aspect.

According to the split-screen display processing method and apparatus, the device, and the storage medium provided in this application, the terminal device obtains the screen splitting operation performed by the user on the touchscreen; splits the current display screen into the two areas based on the screen splitting operation; displays, in the first area, the interface, of the first application, that is displayed on the display screen before the screen splitting; then obtains, from the installed applications by using a specific clustering algorithm, the at least one second application to be combined with the first application in the split-screen manner; and displays the identifier of the at least one second application in the second area after the screen splitting, so that the user can select a required application from these second applications for displaying in the second area. A to-be-displayed application is recommended on a split-screen page based on the specific algorithm, so that the user does not need to find an application that the user wants to start from all the applications, so as to improve split-screen display efficiency and facilitate an operation.

DESCRIPTION OF EMBODIMENTS

Currently, split-screen display solutions commonly used by terminal devices include at least the following several types.

Type 1: In the emotion user interface (Emotion User Interface, EMUI) 9.0 system, a user touches and holds a "historical task" button on a system navigation bar of a terminal device; taps a "split screen" icon of an application screenshot in the historical task, or touches and holds an application and drags the application to a left area of a split screen; and finds a second application requiring a split screen, and enables screen splitting.

Type 2: In the iOS system, a main application (which occupies a full screen) is started, swiping is performed from the bottom to call out an "App Dock (application dock)", and then an application requiring a split screen is dragged from the App Dock to the left or right edge of the screen. After the screen is split, the dragged application is released. By default, a new application requiring a split screen occupies a quarter of a width of the screen.

However, the foregoing two split-screen display manners have the following problems. In the EMUI system, in most split-screen use scenarios, two applications requiring split screens have been started, and have been in a historical task list. Alternatively, two applications requiring split screens are fixedly matched. Currently, a manner of enabling screen splitting and starting the second application is quite unnatural and inefficient. In the iOS system, to start the second application, the user needs to drag the second application to an edge location, and release the second application after finding a correct location. Therefore, screen splitting efficiency is relatively low.

To address the problems in the foregoing solutions, this application provides a split-screen display processing method, so that the user can more conveniently complete a screen splitting operation, to improve screen splitting efficiency and improve user experience. This solution is applied to an intelligent terminal device, for example, a mobile phone or a tablet computer. The following describes the solution in detail by using several specific implementations.

Figure 1:
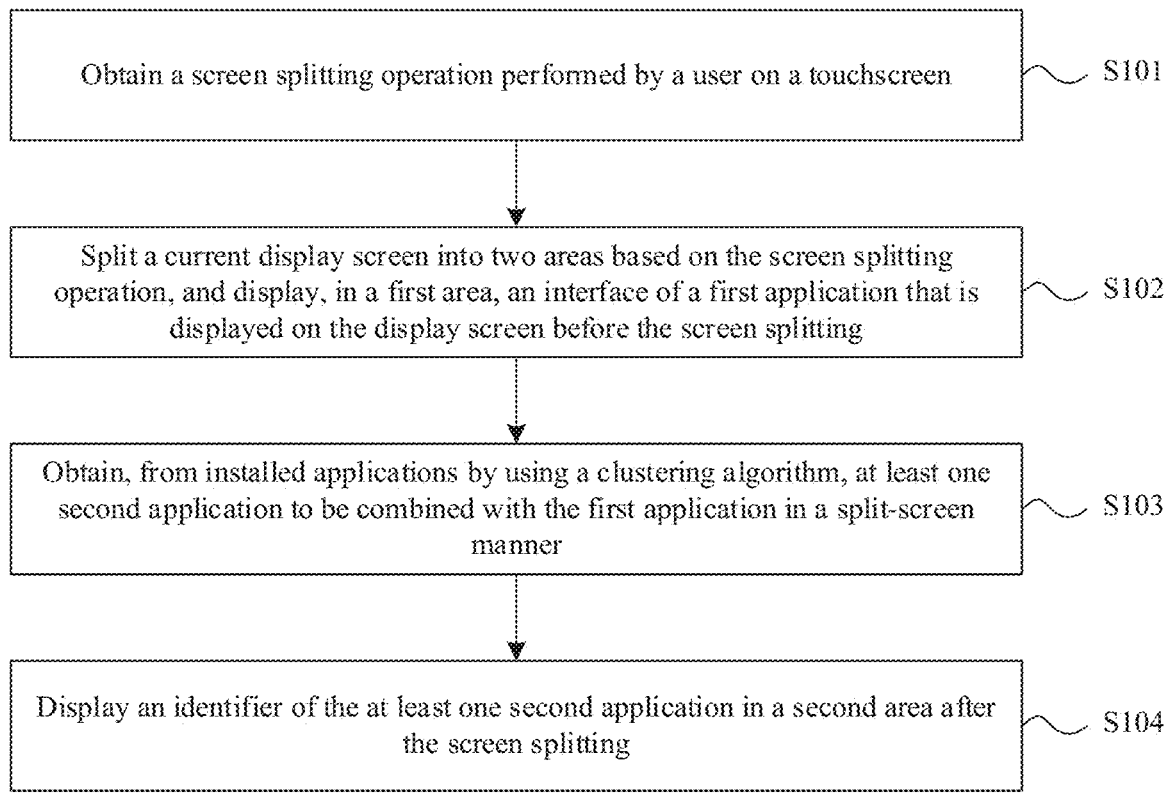
FIG. 1 is a flowchart of Embodiment 1 of a split-screen display processing method according to this application.

FIG. 1 is a flowchart of Embodiment 1 of the split-screen display processing method according to this application. As shown in FIG. 1, the split-screen display processing method includes the following steps.

S101: Obtain a screen splitting operation performed by a user on a touchscreen.

In this step, a screen splitting operation dedicated to screen splitting is set in an implementation of a terminal device. The screen splitting operation may be performed in an application scenario of any terminal device, for example, may be performed when the user uses an application, or may be performed when the terminal device displays a system interface. A use scenario of the screen splitting operation is not limited.

In an implementation of this solution, the screen splitting operation includes any one of the following operations:

Operation 1: a touching and holding operation on an edge of the touchscreen. This solution means that the user touches and holds the edge of the touchscreen to trigger a screen splitting process, to enter a screen splitting operation mode. In this case, a screen may be automatically split into two parts, and a division line is used between the two parts for demarcation. The division line may be used to re-split the screen based on dragging by the user. Alternatively, the division line may be displayed on the touched and held edge of the screen after touching and holding by the user, and a screen of the terminal device is split into two different parts based on dragging of the division line by the user. This is not limited.

Operation 2: an operation of sliding toward the center of the touchscreen after an edge of the touchscreen is touched and held. This solution means that a screen splitting process is triggered after the user touches and holds the edge of the touchscreen, and the sliding operation needs to continue to be performed on a screen, to perform specific screen splitting on the screen. The sliding operation may be an operation of sliding toward the center of the screen. Optionally, in this process, the screen may also display a division line to split different areas of the screen, and the division line may split the screen into areas having different sizes as being dragged by the user.

Operation 3: an operation of sliding from an edge to the center of the touchscreen. In this solution, a touching and holding operation does not need to be performed on the edge of a screen. Instead, the operation of sliding from the edge to the center of the screen is directly performed, to trigger a screen splitting process. Optionally, in this process, the screen may also display a division line to split different areas of the split screen, and the division line splits the screen into areas having different sizes as being dragged by the user.

In addition, the screen splitting operation may alternatively be some other preset operations provided that the operation can be conveniently and directly performed by the user, and can be used to trigger the screen splitting process. This is not limited in this solution.

S102: Split a current display screen into two areas based on the screen splitting operation, and display, in a first area, an interface of a first application that is displayed on the display screen before the screen splitting.

In this step, generally, in a common scenario, split-screen display is only performed when one application that is used by the user needs to be cooperatively used with another application or when content needs to be shown on a plurality of screens. An example in which the user is using the first application is used. When the user triggers the screen splitting process by using any screen splitting operation in the foregoing processes, the screen is split into the two areas, and one area directly displays an interface of the first application that is being used. The two areas may be split up and down or left and right. Sizes of the split areas may be the same or different, and different splitting may be performed based on an operation of the user. This is not limited.

S103: Obtain, from installed applications by using a clustering algorithm, at least one second application to be combined with the first application in a split-screen manner.

In this step, when the foregoing screen splitting operation is performed on the terminal device, a first area of one screen has displayed the first application, and the user needs to select another application that needs to be displayed in the other area. In this solution, based on the clustering algorithm, analysis processing is performed on all the applications installed on the terminal device, to obtain one or more applications that are best combined with the first application in the split-screen manner, namely, the at least one second application.

S104: Display an identifier of the at least one second application in a second area after the screen splitting.

In this step, after obtaining some applications that are best combined with the first application in the split-screen manner, the terminal device needs to display these applications to the user for selection. Therefore, the terminal device may display the identifier of the obtained at least one second application in the second area after the screen splitting, so that the user selects an icon of an application that the user wants to start from the identifier of the obtained at least one second application, and taps the icon to start the application.

Optionally, in a specific implementation of this solution, alternatively, the terminal device may directly select, from all the installed applications, one application that is best combined with the first application in the split-screen manner, directly start the best application in the second area, and display an operation interface of the application. Alternatively, in the second area, the user is prompted whether to start the application, and the user performs a selection operation.

Optionally, in another specific implementation of this solution, after step S104, the method may further include: after the user selects a third application from the at least one second application, starting the third application, and displaying an interface of the third application in the second area. This solution means that after the terminal device displays a plurality of second applications in the second area after the screen splitting by using the clustering algorithm, the user may select, based on a requirement of the user, the third application to be combined with the first application in the split-screen manner from these second applications. In addition, after determining that the user selects the third application, the terminal device starts the third application, and displays the interface of the third application in the second area.

In a specific implementation of this embodiment, in a process of using the terminal device, the user may also start another application, and the another application continues to work in a background and does not exit although not being displayed on the screen. Therefore, in addition to displaying the at least one second application in the second area and recommending a suitable application to the user, a started application may also be displayed in the second area. If the user just wants to select a started application to be combined with the first application in the split-screen manner, the user can directly select the application from the started applications. In other words, when the at least one second application is displayed in the second area, another started application in a system is also displayed in the second area, to provide more choices for the user, and the user does not need to search all the applications one by one.

According to the split-screen display processing method provided in this embodiment, after performing screen splitting on the display of the terminal device based on the screen splitting operation of the user, the terminal device displays, in one area, the first application before the split-screen operation, selects, from all the installed applications by using the clustering algorithm, the one or more second applications that are best combined with the first application in the split-screen manner, and perform recommendation in the second area. In this solution, a to-be-displayed application is recommended on a split-screen based on a specific algorithm, so that the user does not need to find the application that the user wants to start from all the applications, so as to improve split-screen display efficiency and facilitate an operation.

As functions of the terminal device become more abundant, the user may need to split the screen of the terminal device into more areas, to simultaneously run more applications or perform more operations. Based on the foregoing embodiment, this solution further provides a control that can be used to split the screen into more areas, and the control may be displayed at any location on the screen. This is not limited in this solution. Generally, to avoid affecting use and an operation of the user, the split-screen control may be hidden, and displayed on the screen after the user triggers display of the control. For example, the control may be set to be displayed in any area. When the division line is tapped, the display of the control is triggered. Usually, the control is hidden.

In a specific implementation, the foregoing embodiment is used as an example. If it is detected that the user performs a tapping operation on a division line between the first area and the second area, the split-screen control is displayed in the first area or the second area. This solution means that, in the foregoing embodiment, the screen of the terminal device has been split into two areas, and there is a division line between the two areas. After the user taps the division line, the split-screen control is displayed in the first area or the second area. When the user taps the split-screen control, the screen may be split again, so that the screen is split into three areas. By analogy, the display may be split into more areas. The following describes subsequent screen splitting processing in detail.

Figure 2:
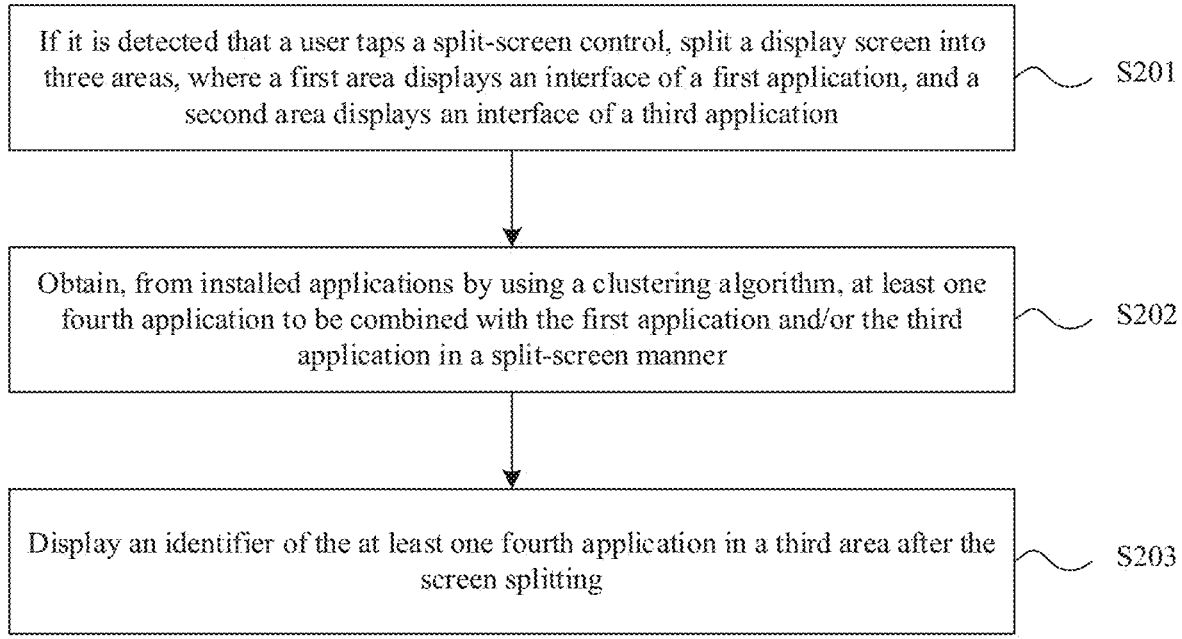
FIG. 2 is a flowchart of Embodiment 2 of a split-screen display processing method according to this application.

FIG. 2 is a flowchart of Embodiment 2 of the split-screen display processing method according to this application. As shown in FIG. 2, the split-screen display processing method specifically includes the following steps.

S201: If it is detected that the user taps the split-screen control, split the display screen into three areas, where a first area displays the interface of the first application, and the second area displays the interface of the third application.

In this step, the user performs an operation on the screen of the terminal device, and the screen is split into two areas. Then, an operation is performed in the foregoing manner, that is, the split-screen control is tapped to perform screen splitting again, so that the display screen may be split into the three areas. Sizes of the three areas may be the same or different. The second screen splitting may be used to split the first area, or may be used to split the second area. This is not limited in this solution. The first area still displays the interface of the initial first application, and the second area displays the third application selected by the user from the plurality of second applications.

S202: Obtain, from the installed applications by using the clustering algorithm, at least one fourth application to be combined with the first application and/or the third application in the split-screen manner.

In this solution, similar to that in Embodiment 1, the terminal device continues to recommend, to the user by using the clustering algorithm, an application to be displayed in a third area from a plurality of applications installed in the system. Generally, one or more fourth applications that are best combined with the first application and/or the third application in the split-screen manner need to be selected. In a specific implementation of this solution, a weight of a combination of the fourth application and the first application and a weight of a combination of the fourth application and the third application may be set, and the two applications are both considered. Alternatively, only whether a combination of the fourth application and the first application or a combination of the fourth application and the third application is best may be determined. This is not limited in this solution.

S203: Display an identifier of the at least one fourth application in the third area after the screen splitting.

In this step, after the at least one fourth application is obtained, identifiers of these fourth applications may be displayed in the third area after the screen splitting processing, so that the user may subsequently select an application specifically displayed in the third area. This application to be displayed in the third area is selected from the fourth applications.

According to the split-screen display processing method provided in this embodiment, a simple split-screen control is set. After the screen is split into the two areas, screen splitting may further continue to be performed through an operation. In addition, the split-screen control is hidden in an application process, and does not cause interference to content displayed on the screen. After the screen splitting, application recommendation may continue to be performed in a new area, so that the user selects an application that needs to be started. This facilitates an operation, and user experience is relatively good.

Based on the foregoing several embodiments, it can be learned that in the split-screen display processing method provided in this application, after a screen splitting operation is performed, an application may be recommended in a new area, and a recommendation manner is based on the clustering algorithm. The following describes the recommendation process in detail by using an example in which one or more second applications are recommended in the second area.

In a solution in which the terminal device obtains the at least one second application, the at least one second application that is best combined with the first application in the split-screen manner is mainly obtained by using an unsupervised learning clustering algorithm and based on historical data of combining each installed application with the first application in the split-screen manner.

Figure 3:
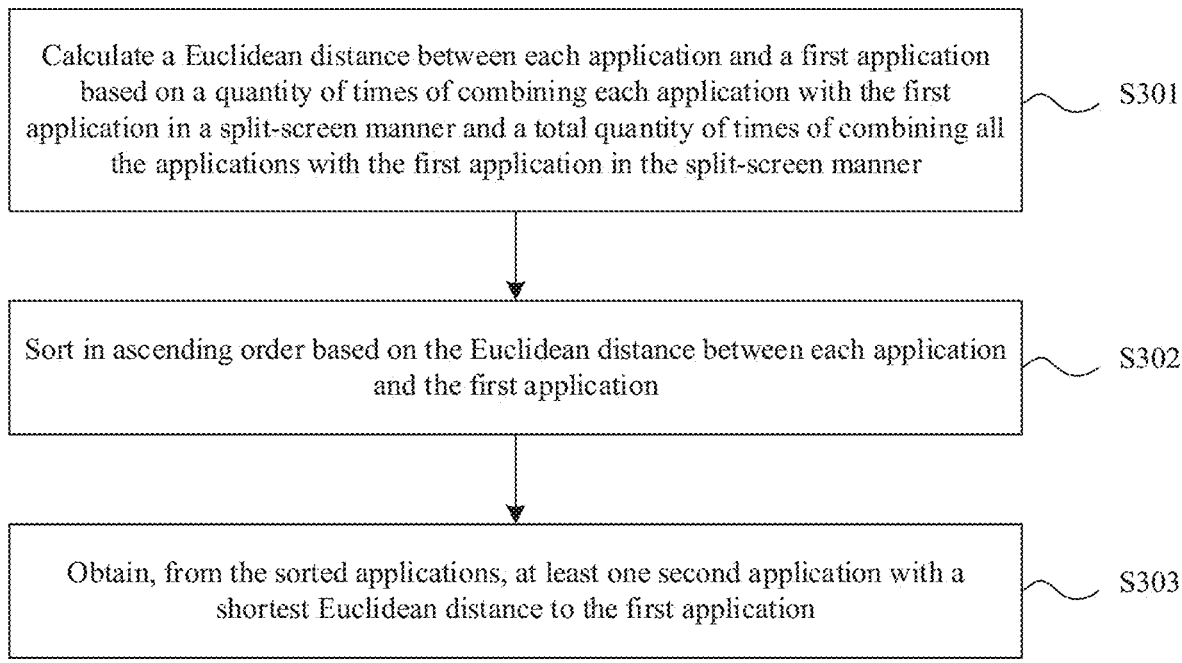
FIG. 3 is a flowchart of Embodiment 3 of a split-screen display processing method according to this application.

In this solution, the terminal device first needs to record data of each time of screen splitting processing by the user, and records which two applications are combined by the user in the split-screen manner for use each time, so that the data can be analyzed to obtain a recommended application. FIG. 3 is a flowchart of Embodiment 3 of the split-screen display processing method according to this application. As shown in FIG. 3, specifically, the split-screen display processing method may include the following processes:

S301: Calculate a Euclidean distance between each application and the first application based on a quantity of times of combining each application with the first application in the split-screen manner and a total quantity of times of combining all the applications with the first application in the split-screen manner.

S302: Sort in ascending order based on the Euclidean distance between each application and the first application.

Herein, a shorter Euclidean distance indicates that the user combines, for more times, an application with the first application in the split-screen manner for use.

S303: Obtain, from the sorted applications, at least one second application with a shortest Euclidean distance to the first application.

The historical data of combining each application with the first application in the split-screen manner includes the quantity of times of combining each application with the first application in the split-screen manner. In this solution, a quantity of the second applications may be set based on an actual situation, and is not specifically limited.

In this solution, comprehensive recommendation is performed based on a clustering algorithm for data and use history of the user, so that the user more conveniently finds an application requiring a split screen, so as to improve user experience.

With reference to the foregoing embodiments, the following uses a mobile phone as an example to describe in detail the split-screen display processing method provided in this solution.

Figure 4A:
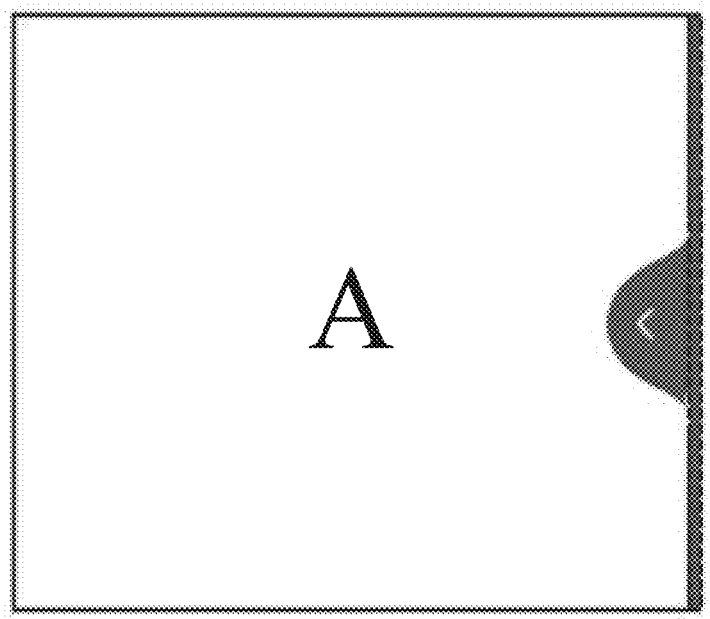
FIG. 4(*a*) to FIG. 4(*d*) are a schematic diagram of a process of an example of a split-screen display processing method according to this application.
Figure 4B:
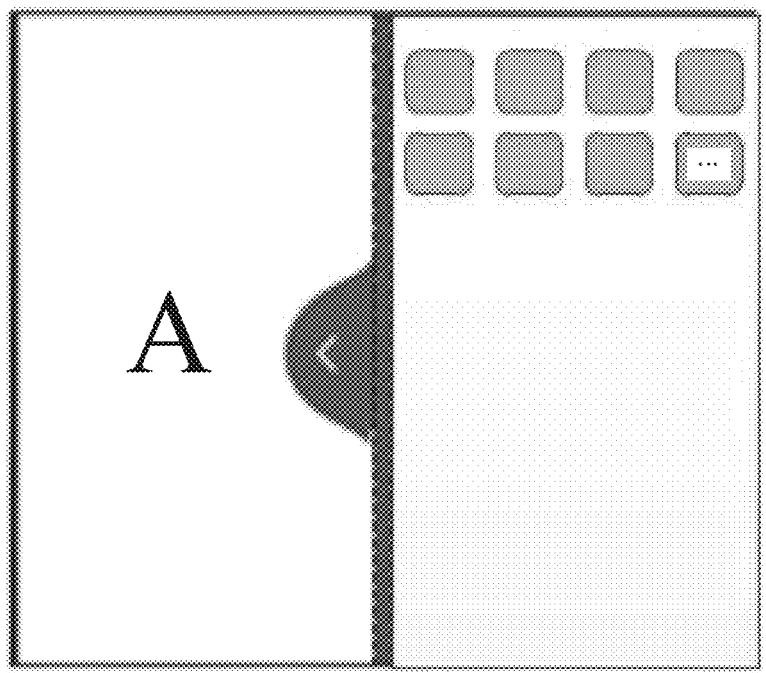

FIG. 4(a) to FIG. 4(d) are a schematic diagram of a process of an example of the split-screen display processing method according to this application. As shown in FIG. 4(a), in a process of using the mobile phone, the user splits a screen by using a preset screen splitting operation, that is, touches and holds a rightmost edge, to display a division line and a drag operation button shown in FIG. 4(a) on the screen. The user presses the division line or the drag operation button to slide left, to split the screen of the mobile phone into a left area and a right area. The left area continues to display content of an operation interface of an application A that is originally in use. However, in the right area of the screen, one or more applications that are best combined with the application A in the split-screen manner need to be obtained based on the clustering algorithm in the foregoing embodiments, for the user to select. A specific clustering process is as follows.

The mobile phone may obtain, in advance, historical split screen matching data of the user of the mobile phone, and/or historical split screen matching data, of another user, that is collected in an entire network. Then, the application A (an application in the first area) is used as a center, to record an application, in a second area, that is matched with the application A. For a given application X, a distance between the application X and the central application A is:

$$d(X) = 1 - \frac{\text{Count}(X)_{second} + \mu \times \text{Count}(X)_{third}}{\text{TotalCount}(A)}$$

μ is a weight coefficient of the application, and 0<μ<1.

TotalCount(A) is a sum of quantities of times of matching all the applications with the application A in the split-screen manner, Count (X) is an accumulation of a quantity of times of matching the application X with the application A in the split-screen manner in a second window (namely, the second area) or a third window (namely, the third area), second indicates the second window, and third indicates the third window.

A distance between each application and the application A can be calculated according to the foregoing formula. To be specific, applications installed on a device (a mobile phone, a tablet computer, or a foldable screen) are traversed, to filter out a started historical application. The applications are traversed, to calculate a Euclidean distance between each application and the central "application A".

Then, by using the Euclidean distances as a sorting basis, the applications are sorted in ascending order based on the Euclidean distances. First eight applications may be obtained as "best matches", and are placed in a recommendation area, as shown in FIG. 4 (b).

Figure 4C:
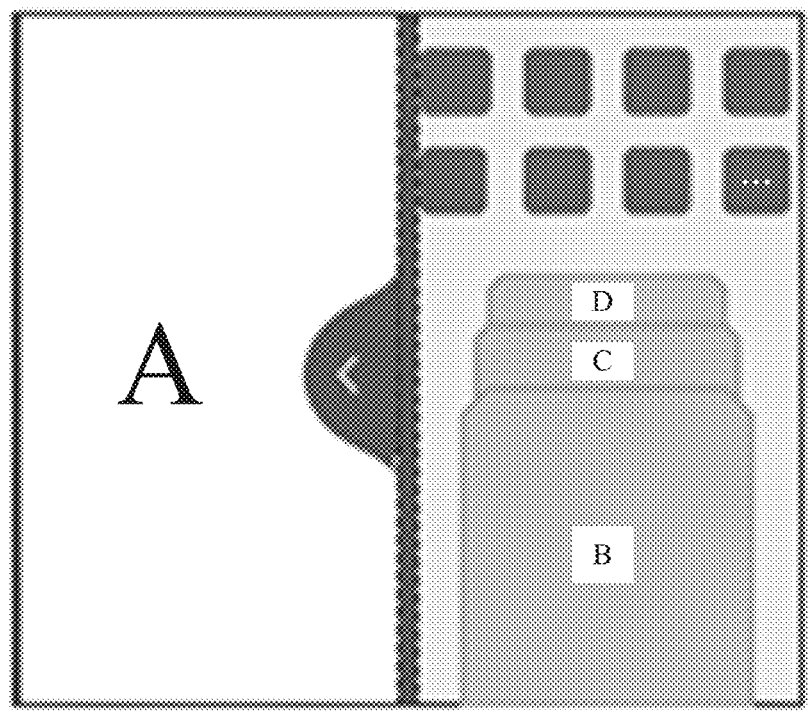
Figure 4D:
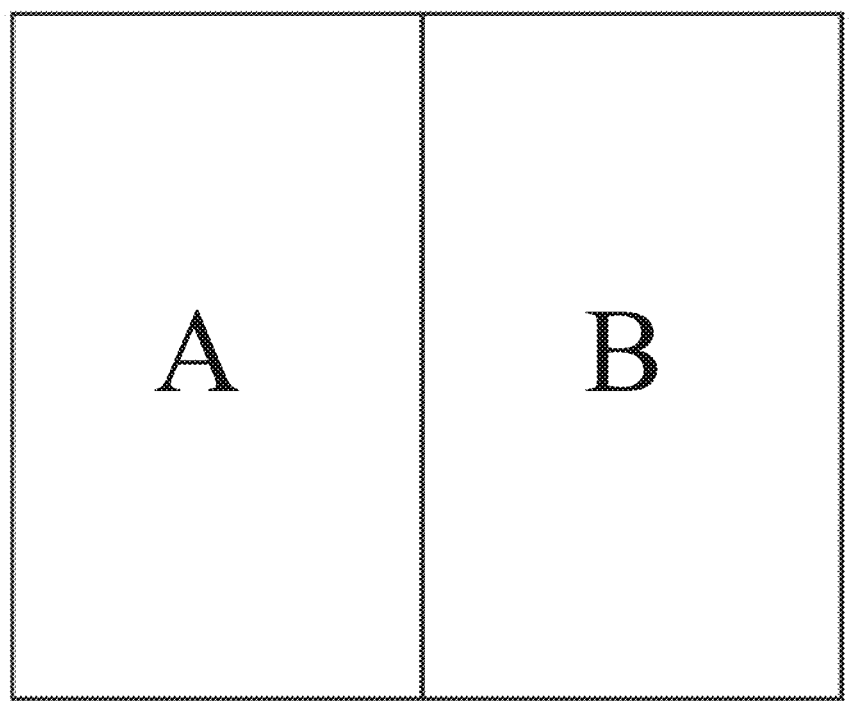

Optionally, in a specific implementation process of this solution, another application that is not exited, namely, another started application, may further exists, and may also be displayed in the second area of the screen after the screen splitting. As shown in FIG. 4(c), applications B. C, and D that are not closed on the mobile phone are all displayed in the second area, so that the user can conveniently make a selection. The user may select, from the eight application icons displayed in the figure or several applications that are not started, an application to be combined with the application A in the split-screen manner. For example, the user selects the application B. In this case, an interface of the application B is displayed in the second area, as shown in FIG. 4(d).

After the foregoing screen splitting process is performed, a split-screen control for the user to continue to perform a screen splitting operation may further be provided on the display screen of the mobile phone, and is hidden when display is not triggered.

Figure 5A:
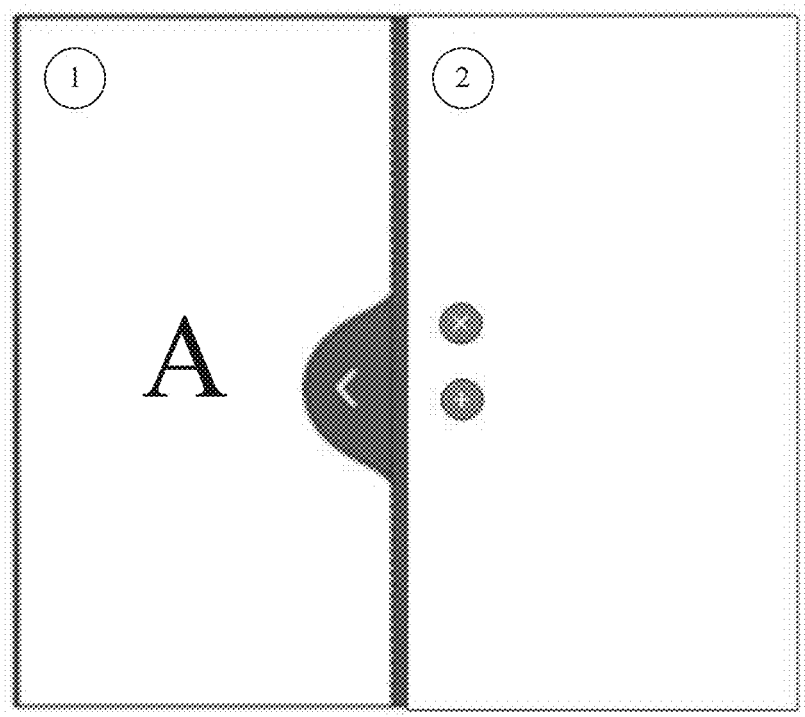
FIG. 5(*a*) to FIG. 5(*c*) are a schematic diagram of a process of another example of a split-screen display processing method according to this application.
Figure 5B:
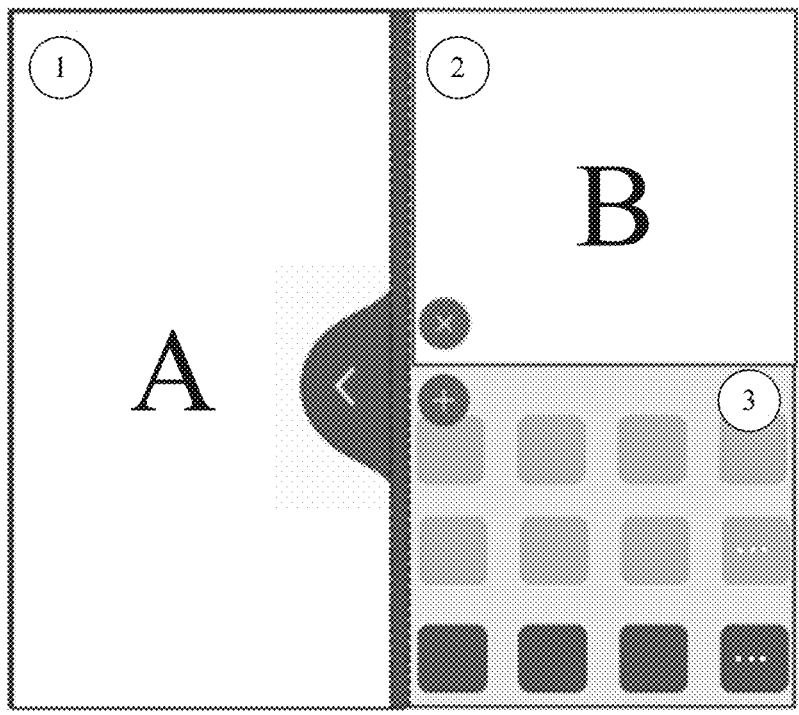
Figure 5C:
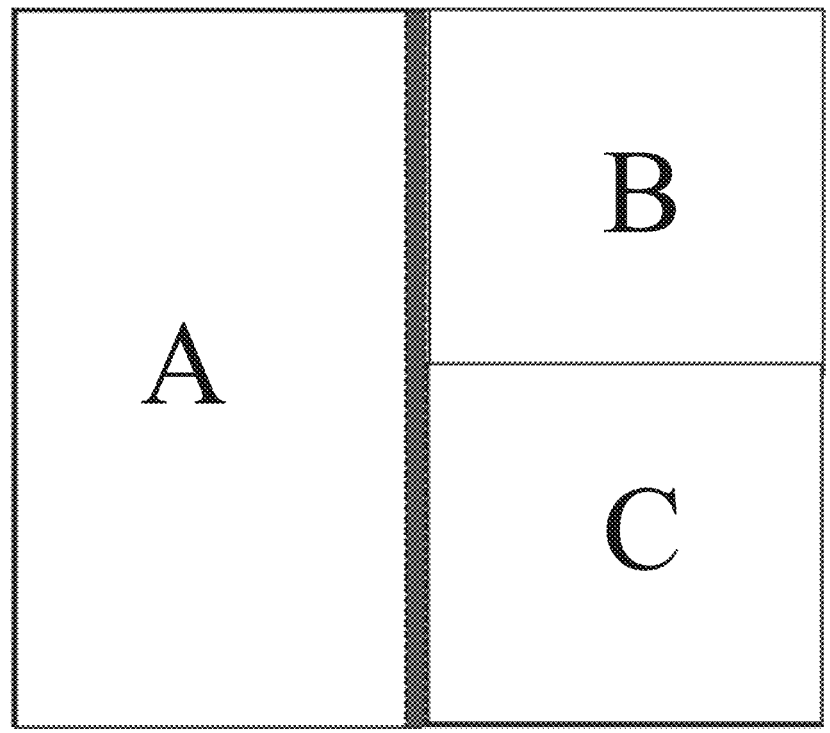

FIG. 5(a) to FIG. 5(c) are a schematic diagram of a process of another example of the split-screen display processing method according to this application. As shown in FIG. 5(a), after tapping the division line after the foregoing screen splitting, the user continues a screen splitting operation, and a corresponding split-screen control may be displayed on an interface, for example, "+" in the figure. After the user taps this symbol, the mobile phone continues to split the screen. In this solution, the split-screen control may alternatively be displayed in the left area. This is not limited.

Optionally, a disabling control may further be set on the screen, for example, "x" in the figure. After the user taps this symbol, a split-screen display mode may exits, and content of the application A is displayed in full screen.

After tapping "+", the user may continue to perform splitting, to split the screen into three areas, namely, areas 1, 2, and 3 in the figure, as shown in FIG. 5(b). First two areas still display the application A and the application B, and one or more applications to be selected by the user are displayed in a third area. Similarly, these applications may also be selected based on a Euclidean distance to the application A or the application B. A specific manner is similar to the foregoing manner of recommending an application when there are two areas. Because a window is relatively small, the historical application and a "recommended application" are both shown as small icons. The application C is started by tapping an icon, and completely occupies the third window, as shown in FIG. 5 (c).

The technical solution of this application is applied to another terminal device, which is similar to being applied to the mobile phone. An operation specifically corresponding to the screen splitting process may be set. After screen splitting processing is performed, an application is recommended in a split area. This prevents the user from searching a large quantity of applications one by one for the application that the user wants to start. By using a natural gesture, the screen splitting enabling is more conform to an operation habit of the user, to improve user experience. Comprehensive recommendation is performed based on an algorithm and the use history of the user, so that the user more conveniently finds the application requiring a split screen, to improve screen splitting processing efficiency and further improve user experience.

Figure 6:
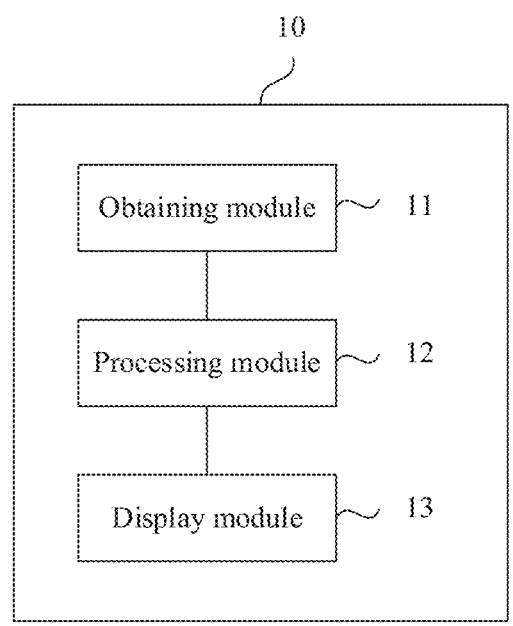
FIG. 6 is a schematic diagram of a structure of an embodiment 1 of a split-screen display processing apparatus according to this application.

FIG. 6 is a schematic diagram of a structure of an embodiment 1 of a split-screen display processing apparatus according to this application. As shown in FIG. 6, a split-screen display processing apparatus 10 includes:

an obtaining module 11, a processing module 12, and a display module 13.

The obtaining module 11 is configured to obtain a screen splitting operation performed by a user on a touchscreen.

The processing module 12 is configured to split a current display screen into two areas based on the screen splitting operation, and control the display module 13 to display, in a first area, an interface of a first application that is displayed on the display screen before the screen splitting.

The processing module 12 is further configured to obtain, from installed applications by using a clustering algorithm, at least one second application to be combined with the first application in a split-screen manner.

The processing module 12 is further configured to control the display module 13 to display an identifier of the at least one second application in a second area after the screen splitting.

The split-screen display processing method provided in this embodiment is used to perform the technical solutions in the foregoing method embodiments. Implementation principles and technical effects thereof are similar, and details are not described herein again.

Based on the foregoing embodiment, the processing module 12 is further configured to:

after the user selects a third application from the at least one second application, start the third application, and control to display an interface of the third application in the second area.

Optionally, the processing module 12 is further configured to:

if it is detected that the user performs a tapping operation on a division line between the first area and the second area, control to display a split-screen control in the first area or the second area.

Optionally, the processing module 12 is further configured to:

if it is detected that the user taps the split-screen control, split the display screen into three areas, and control the display module 13 to display the interface of the first application in a first area and to display the interface of the third application in a second area;

obtain, from the installed applications by using the clustering algorithm, at least one fourth application to be combined with the first application and/or the third application in the split-screen manner; and control the display module 13 to display an identifier of the at least one fourth application in a third area after the screen splitting.

Optionally, the screen splitting operation includes any one of the following operations: a touching and holding operation on an edge of the touchscreen:

an operation of sliding toward the center of the touchscreen after an edge of the touchscreen is touched and held; or an operation of sliding from an edge to the center of the touchscreen.

Optionally, the processing module 12 is specifically configured to:

obtain, by using an unsupervised learning clustering algorithm and based on historical data of combining each installed application with the first application in the split-screen manner, the at least one second application that is best combined with the first application in the split-screen manner.

Optionally, the processing module 12 is specifically configured to:

calculate a Euclidean distance between each application and the first application based on a quantity of times of combining each application with the first application in the split-screen manner and a total quantity of times of combining all the applications with the first application in the split-screen manner;

sort in ascending order based on the Euclidean distance between each application and the first application; and obtain, from the sorted applications, at least one second application with a shortest Euclidean distance to the first application.

The historical data of combining each application with the first application in the split-screen manner includes the quantity of times of combining each application with the first application in the split-screen manner.

Optionally, the processing module 12 is further configured to:

control the display module to display the at least one second application in the second area and further display another started application in a system in the second area.

The split-screen display processing apparatus provided in any one of the foregoing embodiments is configured to perform the technical solutions in the foregoing method embodiments. Implementation principles and technical effects thereof are similar, and details are not described herein again.

Figure 7:
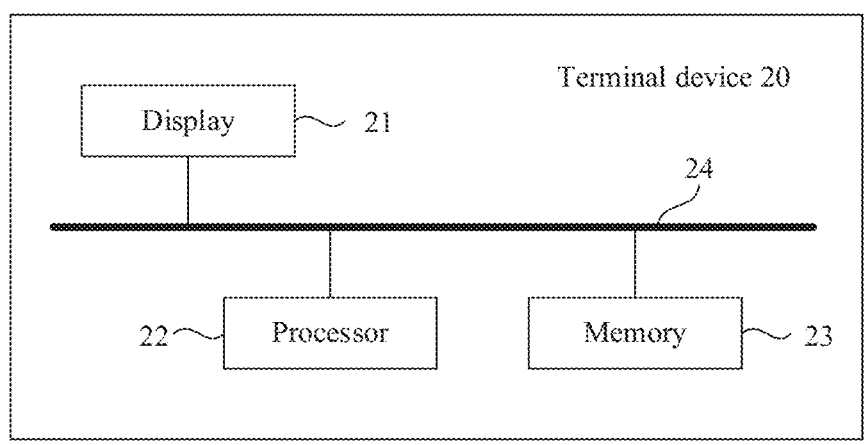
FIG. 7 is a schematic diagram of a structure of an embodiment of a terminal device according to this application.

FIG. 7 is a schematic diagram of a structure of an embodiment of a terminal device according to this application. As shown in FIG. 7, a terminal device 20 includes:

a processor 22, a memory 23, and a display 21, where the memory 23 is configured to store a program and data, and the processor 22 invokes the program stored in the memory, to perform the technical solution of the joint handover method provided in any one of the foregoing embodiments.

In an implementation of the terminal device, the memory 23 and the processor 22 are directly or indirectly electrically connected, to implement data transmission or interaction. For example, these elements may be electrically connected to each other through one or more communications buses or signal cables 24, for example, may be connected to each other through a bus. The memory stores computer-executable instructions for implementing a data access control method, including at least one software function module that may be stored in the memory in a form of software or firmware. The processor executes various function applications and data processing by running a software program and a module that are stored in the memory.

The memory may be, but is not limited to, a random access memory (Random Access Memory, RAM for short), a read-only memory (Read-Only Memory, ROM for short), a programmable read-only memory (Programmable Read-Only Memory, PROM for short), an erasable programmable read-only memory (Erasable Programmable Read-Only Memory, EPROM for short), an electrically erasable programmable read-only memory (Electrically Erasable Programmable Read-Only Memory, EEPROM for short), or the like. The memory is configured to store the program, and the processor executes the program after receiving an execution instruction. Further, the software program and the module in the memory may further include an operating system, and the operating system may include various software components and/or drivers configured to manage a system task (for example, memory management, storage device control, and power management), and may communicate with various hardware or software components, to provide a running environment of another software component.

The processor may be an integrated circuit chip and has a signal processing capability. The processor may be a general-purpose processor, including a central processing unit (Central Processing Unit, CPU for short), a network processor (Network Processor, NP for short), or the like. The processor may implement or perform the methods, the steps, and logical block diagrams that are disclosed in the embodiments of this application. The general-purpose processor may be a microprocessor, or the processor may be any conventional processor or the like.

This application further provides a computer-readable storage medium. The computer-readable storage medium includes a program, and when being executed by a processor, the program is used to perform the technical solution of the split-screen display processing method in any method embodiment.

A person of ordinary skill in the art should understand that all or some of the steps of the method embodiments may be implemented by a program instructing related hardware. The program may be stored in a computer-readable storage medium. When the program is executed, the steps included in the foregoing method embodiments are performed. The storage medium includes any medium that can store program code, such as a ROM, a RAM, a magnetic disk, or an optical disc. A specific medium type is not limited in this application.

What is claimed is:

1. A method comprising:
    obtaining, from a user, a screen splitting operation on a touchscreen;
    splitting a current display screen into a first area and a second area based on the screen splitting operation;
    displaying, in the first area, a first interface of a first application that was displayed on the current display screen before splitting the current display screen;
    obtaining, from installed applications and using an unsupervised learning clustering algorithm and based on historical data of combining each of the installed applications with the first application in a split-screen manner, at least one second application to combine with the first application in the split-screen manner;
    displaying a first identifier of the at least one second application in the second area after splitting the current display screen; and
    displaying, in the second area, a third application that is currently running in a system.

2. The method of claim 1, wherein displaying the third application comprises:
    obtaining, from the user, a selection for the third application that is of the at least one second application;
    starting the third application; and
    displaying a second interface of the third application in the second area.

3. The method of claim 2, further comprising:
    detecting, from the user, a first tapping operation on a division line between the first area and the second area; and
    displaying, in response to the first tapping operation, a split-screen control in either the first area or the second area.

4. The method of claim 3, further comprising:
    detecting, from the user, a second tapping operation on the split-screen control;
    splitting, in response to the second tapping operation, the current display screen into three areas, wherein the first area of the three areas displays the first interface, and wherein the second area of the three areas displays the second interface;

obtaining, from the installed applications and using the unsupervised learning clustering algorithm, at least one fourth application to combine with the first application or the third application in the split-screen manner; and displaying a second identifier of the at least one fourth application in a third area of the three areas.

5. The method of claim 1, wherein the screen splitting operation comprises a touching and holding operation on an edge of the touchscreen.

6. The method of claim 1, wherein the screen splitting operation comprises a sliding operation toward a center of the touchscreen after an edge of the touchscreen has been touched and held.

7. The method of claim 1, wherein the screen splitting operation comprises a sliding operation from an edge of the touchscreen to a center of the touchscreen.

8. The method of claim 1, further comprising:

calculating a plurality of Euclidean distances between each of the installed applications and the first application based on a quantity of times of combining each of the installed applications with the first application in the split-screen manner and a total quantity of times of combining all of the installed applications with the first application in the split-screen manner;

sorting, in ascending order and based on the Euclidean distances, the installed applications; and obtaining, from the installed applications that are sorted, the at least one second application comprising a shortest Euclidean distance to the first application, wherein the historical data comprises the quantity of times of combining each of the installed applications with the first application in the split-screen manner.

9. A terminal device comprising:

a display comprising a touchscreen; and a processor coupled to the display and configured to:

obtain, from a user, a screen splitting operation on the touchscreen;

split a current display screen into a first area and a second area based on the screen splitting operation;

display, in the first area, a first interface of a first application that was displayed on the current display screen before splitting the current display screen;

obtain, from installed applications and using an unsupervised learning clustering algorithm and based on historical data of combining each of the installed applications with the first application in a split-screen manner, at least one second application to combine with the first application in the split-screen manner;

display a first identifier of the at least one second application in the second area after splitting the current display screen; and display, in the second area, a third application that is currently running in a system.

10. The terminal device of claim 9, wherein the processor is further configured to:

obtain, from the user, a selection for the third application that is of the at least one second application;

start the third application; and display a second interface of the third application in the second area.

11. The terminal device of claim 10, wherein the processor is further configured to:

detect, from the user, a first tapping operation on a division line between the first area and the second area; and display, in response to the first tapping operation, a split-screen control in either the first area or the second area.

12. The terminal device of claim 11, wherein the processor is further configured to:

detect, from the user, a second tapping operation on the split-screen control;

split, in response to the second tapping operation, the current display screen into three areas, wherein the first area of the three areas displays the first interface, and wherein the second area of the three areas displays the second interface;

obtain, from the installed applications and using the unsupervised learning clustering algorithm, at least one fourth application to combine with the first application or the third application in the split-screen manner; and display a second identifier of the at least one fourth application in a third area of the three areas.

13. The terminal device of claim 9, wherein the screen splitting operation comprises a touching and holding operation on an edge of the touchscreen.

14. The terminal device of claim 9, wherein the screen splitting operation comprises a sliding operation toward a center of the touchscreen after an edge of the touchscreen has been touched and held.

15. The terminal device of claim 9, wherein the screen splitting operation comprises a sliding operation from an edge of the touchscreen to a center of the touchscreen.

16. The terminal device of claim 9, wherein the processor is further configured to:

calculate a plurality of Euclidean distances between each of the installed applications and the first application based on a quantity of times of combining each of the installed applications with the first application in the split-screen manner and a total quantity of times of combining all of the installed applications with the first application in the split-screen manner;

sort, in ascending order and based on the Euclidean distances, the installed applications; and obtain, from the installed applications that are sorted, the at least one second application comprising a shortest Euclidean distance to the first application, wherein the historical data comprises the quantity of times of combining each of the installed applications with the first application in the split-screen manner.

17. A computer program product comprising computer-executable instructions that are stored on a non-transitory computer-readable storage medium and that, when executed by a processor, cause an apparatus to:

obtain, from a user, a screen splitting operation on a touchscreen;

split a current display screen into a first area and a second area based on the screen splitting operation;

display, in the first area, a first interface of a first application that was displayed on the current display screen before splitting the current display screen;

obtain, from installed applications and using an unsupervised learning clustering algorithm and based on historical data of combining each of the installed applications with the first application in a split-screen manner, at least one second application to combine with the first application in the split-screen manner;

display a first identifier of the at least one second application in the second area after splitting the current display screen; and display, in the second area, a third application that is currently running in a system.

18. The computer program product of claim 17, wherein the computer-executable instructions further cause the apparatus to:

obtain, from the user, a selection for the third application that is of the at least one second application;

start the third application; and display a third interface of the third application in the second area.

19. The computer program product of claim 17, wherein the screen splitting operation comprises a touching and holding operation on an edge of the touchscreen.

20. The computer program product of claim 17, wherein the screen splitting operation comprises a sliding operation toward a center of the touchscreen after an edge of the touchscreen has been touched and held.

* * * * *